Aug. 28, 1928.

L. J. TRACEY ET AL 1,682,153

MEANS FOR IDENTIFICATION

Filed Nov. 12, 1927

INVENTORS
L. J. Tracey and
H. H. Quail
BY
ATTORNEY

Patented Aug. 28, 1928.

1,682,153

UNITED STATES PATENT OFFICE.

LESLIE J. TRACEY AND HAROLD H. QUAIL, OF STOCKTON, CALIFORNIA.

MEANS FOR IDENTIFICATION.

Application filed November 12, 1927. Serial No. 232,882.

This invention relates to motor vehicles, our principal object being to provide a method for enabling the identity of a motor vehicle, and consequently of its owner, to be positively established after the vehicle has hit something in its path and has left the scene of the accident. This method consists essentially in causing a considerable number of small leaflets each having the license number of the car printed thereon, to be deposited all over the ground in the vicinity of the accident when the same occurs; and a further object of the invention therefore is to produce a device or attachment to be applied to the vehicle so that the depositing of the leaflets will take place automatically whenever the vehicle strikes an object in its path.

The employment of our method and the means for carrying out the same, if made compulsory by law, would prove a sure way to enable the authorities to identify and catch those drivers commonly spoken of as "hit and run" drivers, who frequently damage public or private property or maim or kill people by their carelessness and recklessness and who, if the opportunity presents itself and there are no witnesses present, leave the scene of the accident without rendering assistance to any person hurt, or without reporting or making good any property damage done. The attachment also enables the authorities to keep a constant check on the driving of all operators of motor vehicles, and will tend to minimize the disguising of the identify of motor vehicles by thieves, who heretofore made use of the practice of merely changing the license plates of the car being stolen to prevent its being identified by that means.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
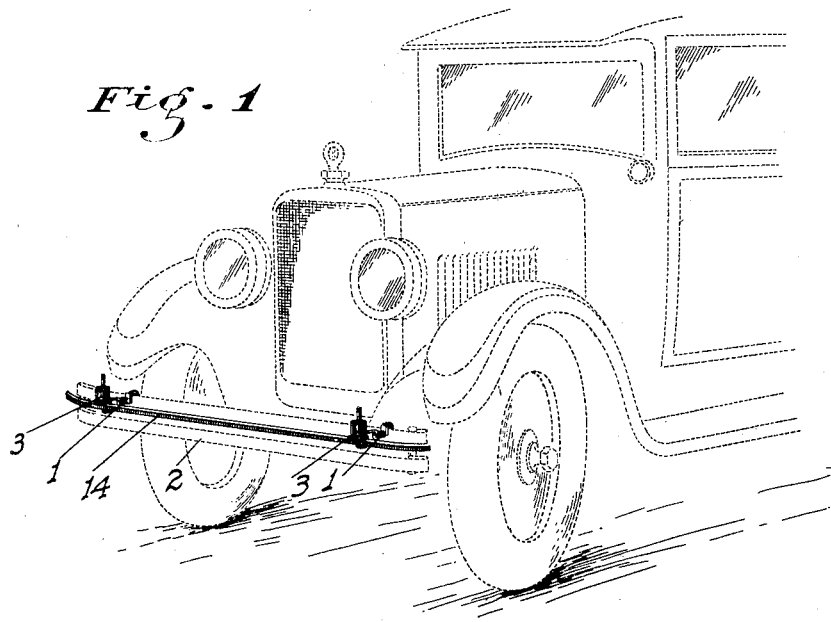
Fig. 1 is a positive elevation of the forward portion of a motor vehicle showing my identifying attachment applied thereto.
Figure 2:
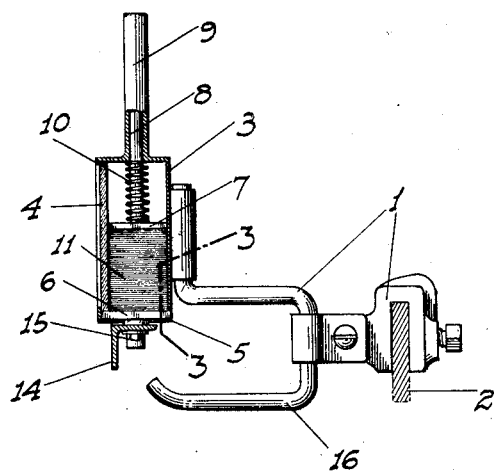
Fig. 2 is a longitudinal section of one of the leaflet holding units.
Figure 4:
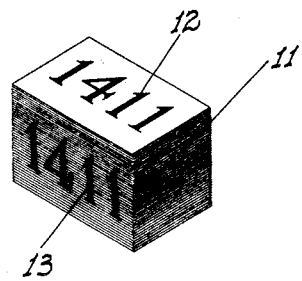
Fig. 4 is a perspective view of a license number leaflet pad.
Figure 3:
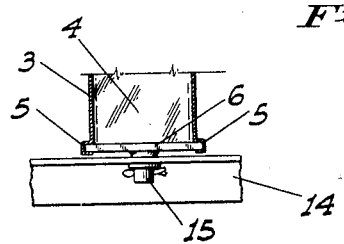
Fig. 3 is a fragmentary transverse section of one of the units on the line 3—3 of Fig. 2.

Referring now more particularly to the characters of reference on the drawings, the attachment comprises a pair of transversely spaced brackets 1 adapted to be fixed onto a member of the motor vehicle at its extreme forward end, preferably the front bumper 2. Supported from the brackets some distance in front of the bumper are vertical and preferably rectangular containers 3, each having a transparent front window 4 and being open at the bottom. The sides of the container at the bottom are formed with opposed horizontal grooves 5 in which a gate or door 6 is freely slidable and which is removable from the rear. A vertical movable presser pad 7 is mounted in the container, said pad being fixed on a stem 8 projecting upwardly therefrom and which is guided in a sleeve 9 provided with the container. A spring 10 about the stem constantly presses the pad down.

A pad 11 of separated leaflets of thin paper is adapted to be mounted in each container between the gate and the presser pad, the spring 10 being then under considerable compression. Each leaflet has the license number of the car printed thereon as at 12, said number being also imprinted on the vertical front edges of the pad as at 13 so that when the pad is in place in the container such number will be visible through the front window.

A horizontal transverse bar 14 whose length is equal at least to that of the bumper 2 and which is disposed ahead of the same some distance and under the gates is suitably connected to the latter as by pins 15. Cradles 16 project forwardly from the brackets under this bar to catch and support the same from dropping to the ground after the gates have moved out of the container grooves.

In operation the bar is normally held against movement with the ordinary driving jars and shocks by reason of the pressure of the springs 10 against the leaflet pads, which pressure is transmitted to the gates which are thus held in firm frictional engagement with their supporting grooves. If the vehicle strikes something head-on however the bar 14, being the extreme foremost fixture on the vehicle, is the first element to engage the obstruction encountered. The bar will therefore be deflected rearwardly and one or the other of the gates and perhaps both will be moved rearwardly so as to clear and drop free of the container. The springs 10 will then act instantly to expel the pads from the containers, and the pads being formed of separated leaves will immediately break up into their component elements, which of course will become scattered in widely dissipated relation all over the adjacent portion of the ground. If the driver therefore leaves the scene without attempting to render aid or without intending to subsequently report the accident or make good any damage, sooner or later he will be apprehended, since each leaflet scattered on the ground carries the license number of the car, and though some leaflets may blow away or be destroyed one at least will be found on the scene to identify the vehicle.

If on the other hand the driver remains on the scene to recover the scattered leaflets so as to conceal his identity it will take him considerable time to gather up all the leaflets, of which there are preferably a great number. Even if he does this however he would have to arrange them in their original order so that the license number would be properly displayed on the front edges of the reassembled pad and the latter reinserted into the container. This latter operation especially is obviously a job which would be impractical if not almost impossible to attempt, and in any case someone is very likely to appear on the scene long before the leaflets are all gathered up.

The leaflet pads are normally retained in the containers and if at any time a policeman or other officer sees a car from which one or the other of the pads is missing he will be instantly aware that the vehicle has been in an accident of some kind and can institute the necessary inquiries to acertain whether the driver has reported the occurrence or not. If the driver's status is clear in the matter he may obtain a new pad upon application to the proper headquarters.

Also if the pad numbers do not correspond with the license plate numbers, the suspicions of the officer would be aroused and he would investigate whether the vehicle had been stolen and the license plates changed, or otherwise ascertain the reason for the discrepancy.

Of course it is to be understood that inasmuch as license plates of all vehicles are changed every year the pads would have to be changed also, and of course the motor vehicle department which distributes the plates would also distribute the necessary sets of pads to the individual car operators.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described our invention what we claim as new and useful and desire to secure by Letters Patent is:

1. An attachment for a motor vehicle including a member arranged to be mounted on the vehicle in a position to be engaged by an obstruction in the path of movement of the vehicle, a plurality of identification means, a container for said means arranged to be mounted on the vehicle, and rearwardly movable means supporting said member and normally holding the identification means in the container.

2. An attachment for a motor vehicle including a container adapted to be mounted on the vehicle, identification leaflets disposed in the container, the bottom of the container being open, a rearwardly sliding gate for said open bottom, and a member connected to said gate and positioned relative to the vehicle to be engaged and moved rearwardly by an obstruction encountered by the vehicle in its path of movement.

3. An attachment for a motor vehicle including a container adapted to be mounted on the vehicle, identification leaflets disposed in the container, the bottom of the container being open, a rearwardly sliding gate for said open bottom, and a bar adapted for sliding movement, extending transversely of the vehicle in front of the same and connected to the gate.

4. A motor vehicle attachment including a container having a window, a pad of separate leaflets in the container, the edges of the leaflets on one side facing the window, means for causing the leaflets to be discharged from the container when the vehicle encounters an obstruction in its path of movement, and identification data printed on the different leaflets and also across said side wedges of the pad facing the window.

5. A motor vehicle attachment including transversely spaced containers, means for supporting the containers from a fixed part of the vehicle, identification leaflets in the containers, the bottoms of said containers being open, rearwardly sliding gates for said open bottoms, a bar connecting and supported by said gates, and adapted to be engaged rearwardly by an obstruction encountered by the vehicle in its path of movement, and means provided with said container supporting means for catching and supporting the bar when the gates have been moved clear of the containers with the rearward movement of the bar.

In testimony whereof we affix our signatures.

LESLIE J. TRACEY.
HAROLD H. QUAIL.